United States Patent
Tabata et al.

(10) Patent No.: US 7,765,051 B2
(45) Date of Patent: Jul. 27, 2010

(54) DEVICE FOR CONTROLLING INTERNAL COMBUSTION ENGINE

(75) Inventors: Masakazu Tabata, Susono (JP); Tomohiro Kaneko, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 788 days.

(21) Appl. No.: 11/597,789

(22) PCT Filed: Mar. 31, 2006

(86) PCT No.: PCT/JP2006/307389
§ 371 (c)(1),
(2), (4) Date: Nov. 28, 2006

(87) PCT Pub. No.: WO2006/104273
PCT Pub. Date: Oct. 5, 2006

(65) Prior Publication Data
US 2009/0210131 A1   Aug. 20, 2009

(30) Foreign Application Priority Data
Mar. 31, 2005   (JP)   ............................. 2005-103634

(51) Int. Cl.
*F02D 41/18*   (2006.01)
(52) U.S. Cl. .................. 701/103; 123/316; 701/110
(58) Field of Classification Search ......... 701/101–105, 701/111; 123/316, 336, 399, 403, 442
See application file for complete search history.

(56) References Cited

U.S. PATENT DOCUMENTS

| | | | |
|---|---|---|---|
| 5,408,969 A * | 4/1995 | Obaraki et al. .............. | 123/336 |
| 6,016,460 A * | 1/2000 | Olin et al. ................... | 701/102 |
| 6,059,057 A * | 5/2000 | Yamazaki et al. ......... | 180/65.235 |
| 6,199,537 B1 * | 3/2001 | Kowatari et al. ............ | 123/399 |
| 6,842,690 B2 * | 1/2005 | Akao et al. ................. | 701/114 |
| 6,945,226 B2 * | 9/2005 | Yu et al. ..................... | 123/399 |
| 6,973,912 B1 * | 12/2005 | Shimatsu et al. ......... | 123/339.1 |

FOREIGN PATENT DOCUMENTS

| | | |
|---|---|---|
| JP | 09/264146 | 10/1997 |
| JP | 2000-161113 A | 6/2000 |
| JP | 2000-161124 A | 6/2000 |
| JP | 2000-248946 | 9/2000 |
| JP | 2003-138975 A | 5/2003 |

* cited by examiner

*Primary Examiner*—Willis R. Wolfe, Jr.
*Assistant Examiner*—Johnny H Hoang
(74) *Attorney, Agent, or Firm*—Kenyon & Kenyon LLP

(57) ABSTRACT

An internal combustion engine to which the inventive device for controlling an internal combustion engine is applied includes an intake control valve provided in an air-intake path at a position upstream from an intake valve, the intake control valve being controlled to be either in an operative state operating in relation to the operation of the intake valve or in an non-operative state maintaining the air-intake path always open, and, in the operative state, closed at least prior to the opening of the intake valve and opened after the opening of the intake valve to generate the pressure difference between the upstream and downstream from the intake control valve. The device for controlling an internal engine includes a detector for detecting a value corresponding to an amount of intake air fed to the internal combustion engine, and correction means for correcting the value detected by the detector, in correspondence to the operation characteristics of the intake control valve when the intake control valve is in the operative state.

5 Claims, 8 Drawing Sheets

DEVICE FOR CONTROLLING INTERNAL COMBUSTION ENGINE

This is a 371 national phase application of PCT/JP2006/307389 filed 31 Mar. 2006, claiming priority to Japanese Patent Application No. 2005-103634 filed 31 Mar. 2005, the contents of which are incorporated herein by reference.

FIELD OF THE INVENTION

The present invention relates to a device for controlling an internal combustion engine having an intake control valve provided in an air-intake path located upstream from an intake valve, capable of switching between a state wherein the intake control valve remains open; that is, a non-operative state wherein the air-intake path remains open and an state wherein the intake control valve carries out an opening-and-closing operation in accordance with the opening/closing timings of the intake valve; that is, an operative state wherein the intake control valve is operative in relation to the operation of the intake valve.

BACKGROUND OF THE INVENTION

Conventionally, a technology has been proposed for controlling air-intake into an engine by providing an intake control valve in an air-intake path upstream from an intake valve; one example thereof is disclosed in Japanese Patent Application Laid-open No. 2000-248946. The intake control valve disclosed therein continuously remains at an open position so that the air-intake path is open as far as the super-charging is not desired. On the other hand, when the super-charging is desired, the intake control valve is operated to occupy a closed position at an initial stage of the intake stroke during the operation of the engine so that the air-intake path is closed, and then suddenly operated in the opening direction when the pressure difference becomes large between the upstream and the downstream from the intake control valve in the air-intake path, to open the air-intake path. Thus, air in the air-intake path is strongly accelerated by the negative pressure downstream from the intake control valve so that the charging efficiency thereof is facilitated. The supercharging obtained in such a manner is referred to as a so-called "impulse supercharging".

In this regard, the summary of the above-mentioned impulse supercharging is also described in the paper published on September 9, in Frankfurt Motor Show 2003, titled as "Impulses for Greater Driving Fun" by Siemens VDO Automotive AG.

SUMMARY OF THE INVENTION

According to the above-mentioned paper, when the intake control valve is operated to be open and close as described above to perform the supercharging in comparison with a state wherein the intake control valve continuously remains at the open position, a flow rate of air running in the air-intake path becomes larger since the supercharging is carried out while using the pressure difference between the upstream and the downstream from the intake control valve in the air-intake path. As a result, a pulsation of intake air, for example, may occur in the air-intake path. Accordingly, there may be a possibility in that a measured amount of intake air is different from an actual fed amount of intake air.

Accordingly, an object of the present invention is to provide a device for controlling an internal combustion engine in the internal combustion engine having such an intake control valve as described above, capable of reducing the measurement error of an amount of intake air to properly control the internal combustion engine based on the actual amount of intake air.

To solve the above problems, the inventive device for controlling an internal combustion engine comprises an intake control valve provided in an air-intake path at a position upstream from an intake valve, the intake control valve being controlled to be either in an operative state operating in relation to the operation the intake valve or in an non-operative state maintaining the air-intake path always open, and, in the operative state, closed at least prior to the opening of the intake valve and opened after the opening of the intake valve to generate the pressure difference between the upstream and downstream from the intake control valve; the device comprising a detector for detecting a value corresponding to an amount of intake air fed to the internal combustion engine, and correction means for correcting the value corresponding to the amount of intake air detected by the detector, in correspondence to the operation characteristics of the intake control valve when the intake control valve is in the operative state.

According to the above structure, when the intake control valve is in the operative state, the value corresponding to the amount of intake air detected by the detector is corrected in correspondence to the operation characteristics of the intake control valve. Thus, even if there is an influence such as pulsation of intake air or others to the valve corresponding to the amount of intake air detected by the detector when the intake control valve is in the operative state, such influence is mitigated. That is, the value corresponding to the amount of intake air detected by the detector better reflects the actual amount of intake air. Since the measurement error of the amount of intake air is reduced in such a manner, it is possible to properly control the internal combustion engine based on the actual amount of intake air.

Preferably, said correction means uses an opening timing of the intake control valve in correspondence to the opening timing of the intake valve among the operation characteristics of the intake control valve. The pressure difference between upstream and downstream from the intake control valve is approximately determined by the opening timing of the intake control valve relative to the opening timing of the intake valve. And, the pulsation or others occur in the air-intake path due to this pressure difference. Accordingly, by using the opening timing of the intake control valve corresponding to the opening timing of the intake valve among the operation characteristic of the intake control valve, it is possible for the correction means to properly correct the value corresponding to the amount of intake air detected by the detector and to reduce the measurement error of the amount of intake air.

In this case, the correction means preferably makes the correction amount larger as the opening timing of the intake control valve is later in relation to the opening timing of the intake valve. Generally, the larger the pressure difference in the air-intake path between upstream and downstream from the intake control valve, the larger the pulsation of the intake air generated in the air-intake path. Accordingly, the difference of the measured amount of intake air from the actual amount of intake air may increase. Therefore, since the corrected amount becomes larger as the opening timing of the intake control valve is later in relation to the opening timing of the intake valve, it is possible to more properly correct the value corresponding to the amount of intake air detected by the detector.

Particularly, when the detector is an air-flow meter of a hot-wire type, the correction means preferably corrects the value corresponding to the amount of intake air detected by the air-flow meter to be larger so that the actual mount of intake air is reflected. If the air-flow meter of a hot-wire type is used as the detector, there is a tendency in that as the pulsation of intake air in the air-intake path increases, the measured amount of intake air in correspondence to the value corresponding to the amount of intake air detected by the detector becomes smaller than the actual amount of intake air. Accordingly, by the above-mentioned correction, it is possible to bring the value corresponding to the amount of intake air detected by the detector close to the actual amount of intake air.

Or, when said detector is a sensor for detecting a pressure in an air-intake pipe, the correction means preferably corrects the value corresponding to the amount of intake air detected by the sensor to be smaller so that the actual mount of intake air is reflected. If the sensor for detecting the pressure in the air-intake pipe is used as the detector, there is a tendency in that as the pulsation of intake air in the air-intake path increases, the measured amount of intake air corresponding to the value in correspondence to the amount of intake air detected by the detector becomes larger than the actual amount of intake air. Accordingly, by the above-mentioned correction, it is possible to bring the value corresponding to the amount of intake air detected by the detector close to the actual amount of intake air.

In addition, preferably, the device further comprises error determination means for determining that the value corresponding to the amount of intake air is erroneous if the deviation of the value from a predetermined valve is out of a predetermined range, wherein the error determination means has, as the predetermined range, a first error determination range used when the intake control valve is in the operative state, and a second error determination range used when the intake control valve is in the non-operative state; the first error determination range being set to be larger than the second error determination range. Since the first error determination range is used for determining whether or not the value is erroneous when the intake control valve is in the operative state, which range is wider than the second error determination range used when the intake control valve is in the non-operative state, it is possible to avoid the determination in that the value corresponding to the amount of intake air is erroneous, provided it is within the first error determination range, even if the value corresponding to the amount of intake air is largely deviated from the predetermined value because of the operative state of the intake control valve.

DETAILED DESCRIPTION

The inventive device for controlling an internal combustion engine will be described below in more detail based on the preferred embodiments. Note the inventive device for controlling the internal combustion engine is applicable to an internal combustion engine with an intake control valve in an air-intake path.

Figure 1:
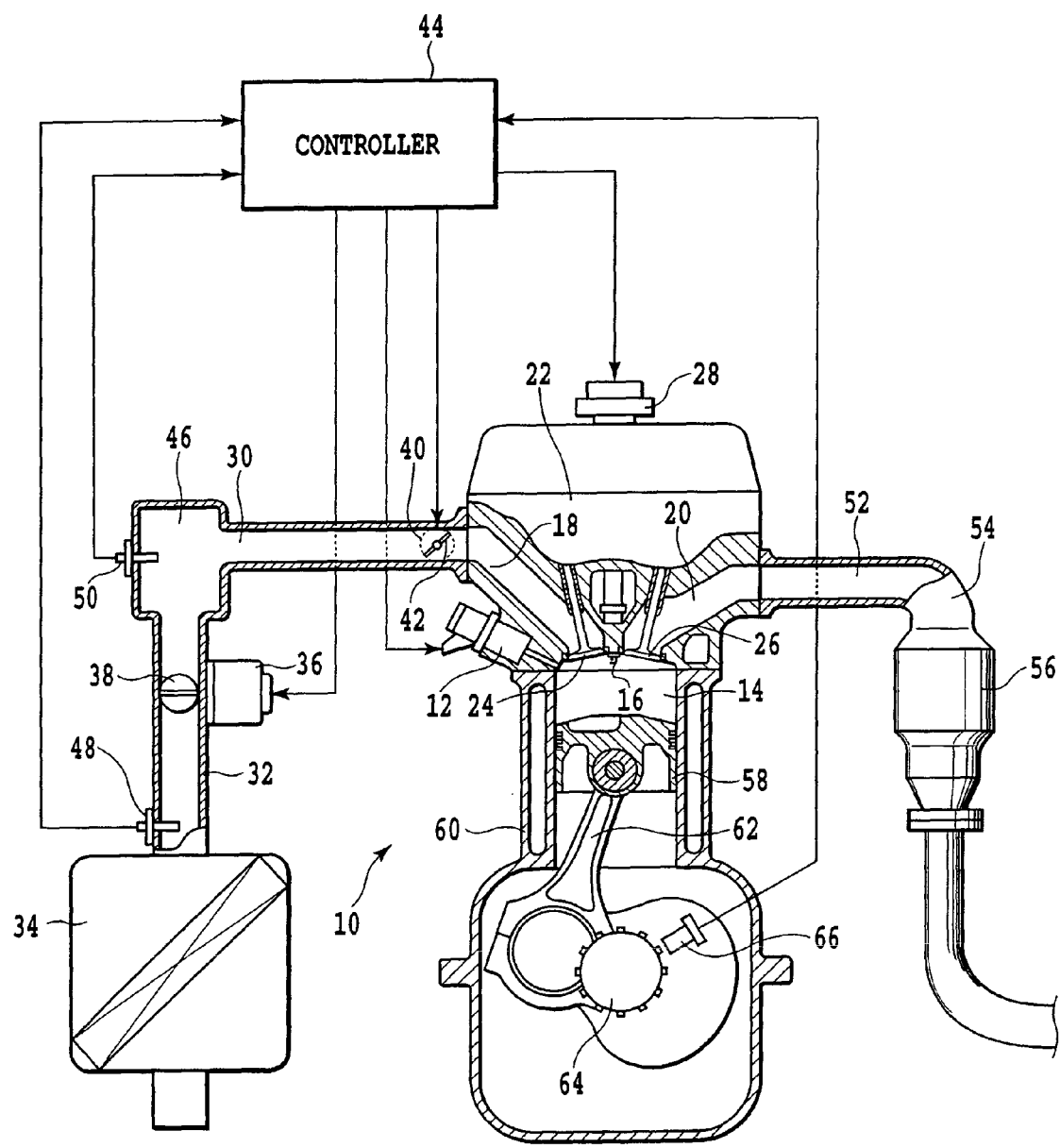
FIG. 1 is a conceptual illustration of an engine system of a direct injection type to which is applied the device for controlling internal combustion engine according to a first embodiment.

First, FIG. 1 is a conceptual illustration of an engine system to which is applied a first embodiment of a device for controlling the internal combustion engine. The internal combustion engine; that is, engine 10 according to the first embodiment of the present invention is of a type wherein fuel such as gasoline is directly injected from a fuel injection valve 12 into a combustion chamber 14 and ignited by an ignition plug 16. In a cylinder head 22 wherein an intake port 18 and an exhaust port 20 are respectively formed while being faced to the combustion chamber 14, there are incorporated a valve-motion mechanism (not shown) for driving an intake valve 24 for opening/closing the intake port 18 and an exhaust valve 26 for opening/closing the exhaust port 20, and the ignition plug 16 for igniting gaseous mixture in the combustion chamber 14. Further, an ignition coil 28 is mounted thereto for generating spark in the ignition plug 16.

On the upstream side of an air-intake pipe 32 connected to the cylinder head 22 to define an air-intake path 30 together with the intake port 18, an air cleaner 34 is provided for guiding outer air to the air-intake path 30 after removing dust or others contained therein. In a portion of the air-intake pipe 32 located downstream from this air cleaner 34, a throttle valve 38 is incorporated, an opening degree of which is adjustable by a throttle actuator 36 based on an step-in amount of an accelerator pedal not shown operated by a driver. According to the first embodiment, while the step-in operation of the accelerator pedal and the opening/closing operation of the throttle valve 38 are electrically controllable independently from each other, the accelerator pedal and the throttle valve 38 may be mechanically coupled to each other.

In addition, in a portion of the air-intake pipe 32 located downstream from the throttle valve 38, an intake control valve 42 is incorporated, which is operable by an actuator 40 at a predetermined instant to open/close the air-intake path 30 in correspondence to the opening/closing timing of the intake valve 24 described later. According to the first embodiment, the intake control valve 42 is controlled by a controller 44 described later to open or close when the operating state reaches a predetermined driving area so that the engine 10 is supercharged. In this regard, when the intake control valve 42 is not in the opening/closing operation; i.e., there is no need for supercharging the engine 10, the intake control valve 42 remains in an open state. When the engine 10 has a plurality of intake ports 18 per cylinder, it may be possible to provide one intake control valve 42 per every intake port to individually open/close the respective intake port 18. Alternatively, all the intake control valves 42 in the respective cylinder may be controlled together to open/close. The intake control valve 42 and the actuator 40 thereof are preferably extremely high in control response characteristic so that the intake control valve 42 could be accurately open/close at a desired instant in correspondence to the open/close timings of the intake valve 24.

Note, in this specification, a state wherein the intake control valve 42 operates in relation to the operation of the intake valve 24 to supercharge the engine 10 as described above is referred to as an "operative state". Another state wherein the intake control valve 42 remains open to maintain the air-intake path 30 to be open as described above is referred to as a "non-operative state".

In the first embodiment, an air-flow meter 48 for detecting a flow rate of air running through the air-intake path 30 and outputting the same to the controller 44 is attached as detector to the air-intake pipe 32 wherein a serge tank 46 is formed midway thereof. In this regard, this air-flow meter 48 is an air-flow meter of a hot-wire type. More specifically, in the air-flow meter 48, a heat wire is disposed in an air stream as a heat generator and heated by supplying electric current therethrough. The flow rate of air fed to the engine is measured by a resistance for measuring a temperature of intake air and a heating resistance of the heat wire. When the flow rate of air changes (i.e., when an amount of irradiated heat from the heat wire changes), an electric power fed to the heating resistance is controlled in a feedback manner to maintain the difference at a constant value between the resistance for measuring the temperature of intake air and the heating resistance, which electric power is converted to a voltage and output to the controller 44. The controller 44 determines the flow rate of air from preliminarily given data representing the relationship between the voltage output from the air-flow meter 48 and the flow rate of air.

Further, an intake air pressure sensor 50 is attached to the air-intake pipe 32, for detecting a pressure in the surge tank 46 and outputting the same to the controller 44. In this regard, the intake air pressure sensor 50 in this embodiment is a vacuum sensor.

Positions at which are located the air-flow meter 48 and the intake air pressure sensor 50 in the air-intake pipe 32 are not limited to those illustrated in FIG. 1, provided they are upstream from the intake control valve 42. For example, the air-flow meter 48 may be disposed in the air cleaner 34, or in a portion of the air-intake pipe 32 located upstream from the intake control valve 42 as well as downstream from the throttle valve 38.

On the way of exhaust pipe 54 for defining, together with the exhaust port 20, an exhaust path 52 while coupled to the cylinder head 22 to communicate with the exhaust port 20, a three way catalyst 56 is incorporated for making harm material harmless, generated by the combustion of the gaseous mixture within the combustion chamber 14. It is also effective to arrange a plurality of such three way catalysts 56 in series along the exhaust path 52.

Thus, air fed into the combustion chamber 14 from the air-intake pipe 32 through the air cleaner 34 is mixed with fuel injected into the combustion chamber 14 from the fuel injection valve 12 to form gaseous mixture. The gaseous mixture is ignited by a spark of the ignition plug 16 and burns. The exhaust gas generated thereby is exhausted through the three way catalyst 56 from the exhaust pipe 54 to an outer air.

In a cylinder block 60 wherein a piston 58 reciprocates, a crank angle sensor 66 is mounted for detecting a rotational phase of a crank shaft 64 coupled to the piston 58 via a connecting rod 62; i.e., a phase of crank angle, and outputting the same to the controller 44. According to the first embodiment, the rotational speed of the engine is determined based on the phase of crank angle output from the crank angle sensor 66.

The controller 44 according to the first embodiment is constructed such that it includes functions of correction means for correcting a value corresponding to the amount of intake air detected by the detector, and error determination means for determining whether or not the value corresponding to the amount of intake air is erroneous. Concretely, the controller 44 is constituted by a microcomputer including CPU, ROM, RAM, A/D converter, an input interface, output interface or others. To the input interface, sensors 48, 50, 66 or others are connected via electric wiring. The output interface outputs operation signals based on detection signals from the sensor 48, 50, 66 or others to various actuators or others via electric wiring so that the engine 10 is smoothly driven in accordance with a predetermined program. Thereby, the operations of the fuel injection valve 12, the ignition coil 28, the throttle actuator 36, the actuator 40 or others are controlled.

The above-mentioned intake control valve 42 in the first embodiment is operated by the actuator 40 so that it opens later than the opening timing of the intake valve 24 and closes, e.g. earlier than the closing timing of the intake valve 24, base on the command from the controller 44. In this regard, according to the first embodiment, the intake control valve 42 may close simultaneously with the closing timing of the intake valve 24 or later than the closing thereof. As a result, air in the air-intake path 30 located on the upstream side of the intake control valve 42 flows at once into the combustion chamber 14 with a negative pressure at the end stage of the intake stroke of the engine 10, whereby it is possible to fill the interior of the combustion chamber 14 with a large amount of air due to a kind of inertia supercharging effect. In other words, according to this supercharging using the intake control valve 42, the supercharging is actually carried out immediately after starting the control of the engine 10, while using the inertia of intake air and a large negative pressure generated downstream from the intake control valve 42. Thus, it is better in the response characteristic of the acceleration than the turbo type supercharging system or others to eliminate a so-called acceleration delay of a vehicle.

By the way, in the operative state wherein the intake control valve 42 is operated to be open and close in accordance with the opening/closing timing of the intake valve 24, that is, in the above-mentioned so-called impulse supercharging state, the flow rate of air fed to the engine 10 becomes larger than in the non-operative state wherein the intake control valve 42 remains open, since the supercharging to the combustion chamber 14 is carried out while using the pressure difference in the air-intake pipe 32 between upstream and downstream from the intake control valve 42. Thereby, there may be a case wherein air once flowing into the engine 10 is bounded from one end the combustion chamber 14 to flow backward to air-intake path 30, resulting in the pulsation of air supercharged to the engine 10. In addition thereto, as describe above, since the flow rate of air fed to the engine 10 is large, not only the pulsation of intake air but also the pulsation of pressure wave due to the vibration transmission occurs in the air-intake pipe 32. Further, since the flow rate of air to the engine 10 is large when the intake control valve 42 is in the operative state, there may be a difference in an amount of air supercharged to the engine 10 due to, for example, a slight lag of the opening/closing timing of the intake control valve or the error in the products. Thereby, there may be measurement errors in the measured value obtained by using the air-flow meter 48 relative to an actual amount of intake air.

Figure 2:
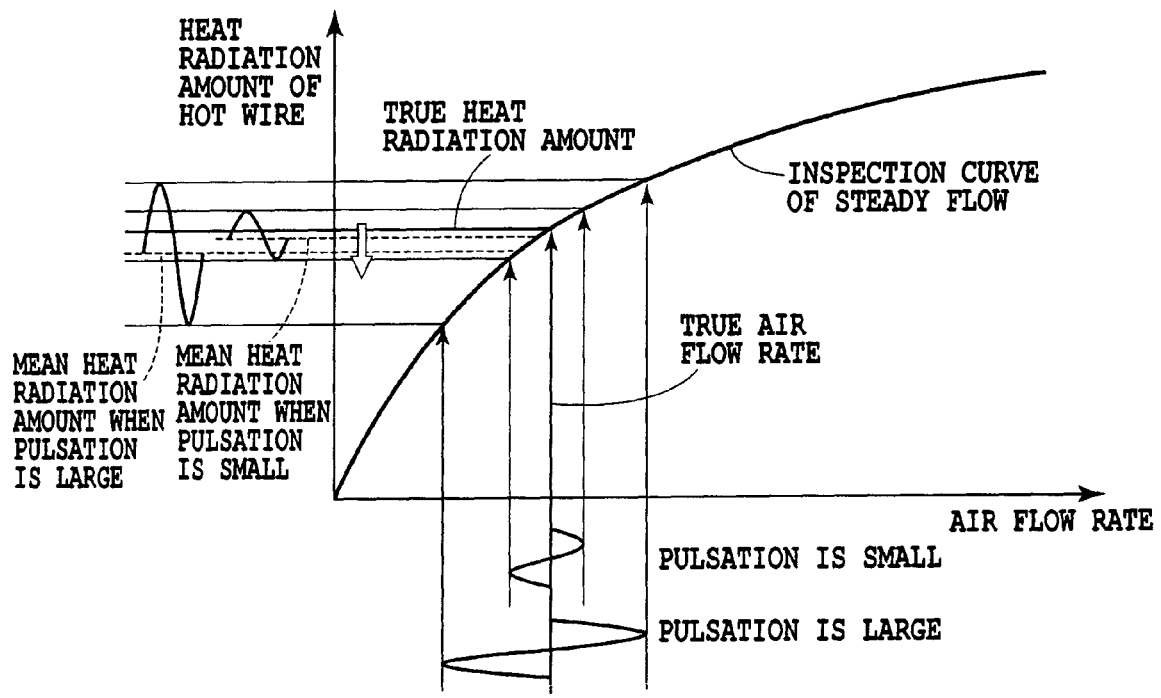
FIG. 2 is a graph representing the relationship between an amount of intake air and heat radiation amount of hot wire of an air flow meter.

For instance, if the air-flow meter 48 is an air-flow meter of a hot-wire type described above, as schematically shown in FIG. 2 by way of example, the measured value of amount of intake air is liable to decrease as the change in the pulsation of intake air becomes larger, that is, as the pulsation increases. It is because a mean amount of heat radiation from the air-flow meter 48 of a hot-wire type becomes smaller, as the change in the pulsation of intake air becomes larger, that is, as the pulsation increases. As a result, there may be a non-negligible error occurs between the measured value of amount of intake air and the actual amount of air taken into the engine 10 (hereinafter referred to as "actual amount of intake air"). And, if an amount of fuel corresponding to the measured value of amount of intake air is injected, the air/fuel ratio deviates from a desired value whereby the proper control of the output of engine 10 is difficult. When the engine is controlled to be properly driven, for example, at a theoretical air/fuel ratio during a steady running in spite of the measured amount of intake air being larger than the actual amount of intake air taken into the engine 10, a ratio of fuel in the gaseous mixture becomes large which is unfavorable in the driving of engine on the standpoint of fuel consumption or exhaust emission. On the contrary, when the measured amount of intake air is smaller than the actual amount of intake air, a ratio of fuel in the gaseous mixture becomes small and it becomes easy to generate knocking. Also, there is also a problem of durability. To avoid such states, according to the device for controlling the internal combustion engine according to the first embodiment, the value corresponding to the amount of intake air detected by the air-flow meter 48 used as detector is corrected in accordance with a flow chart shown in FIG. 3. Particularly, when the intake control valve 42 is in the operative state, the value corresponding to the amount of intake air detected by the detector is corrected in correspondence to the operation characteristics of the intake control valve 42. In this regard, the routine in FIG. 3 is carried out at a predetermined timing.

Figure 3:
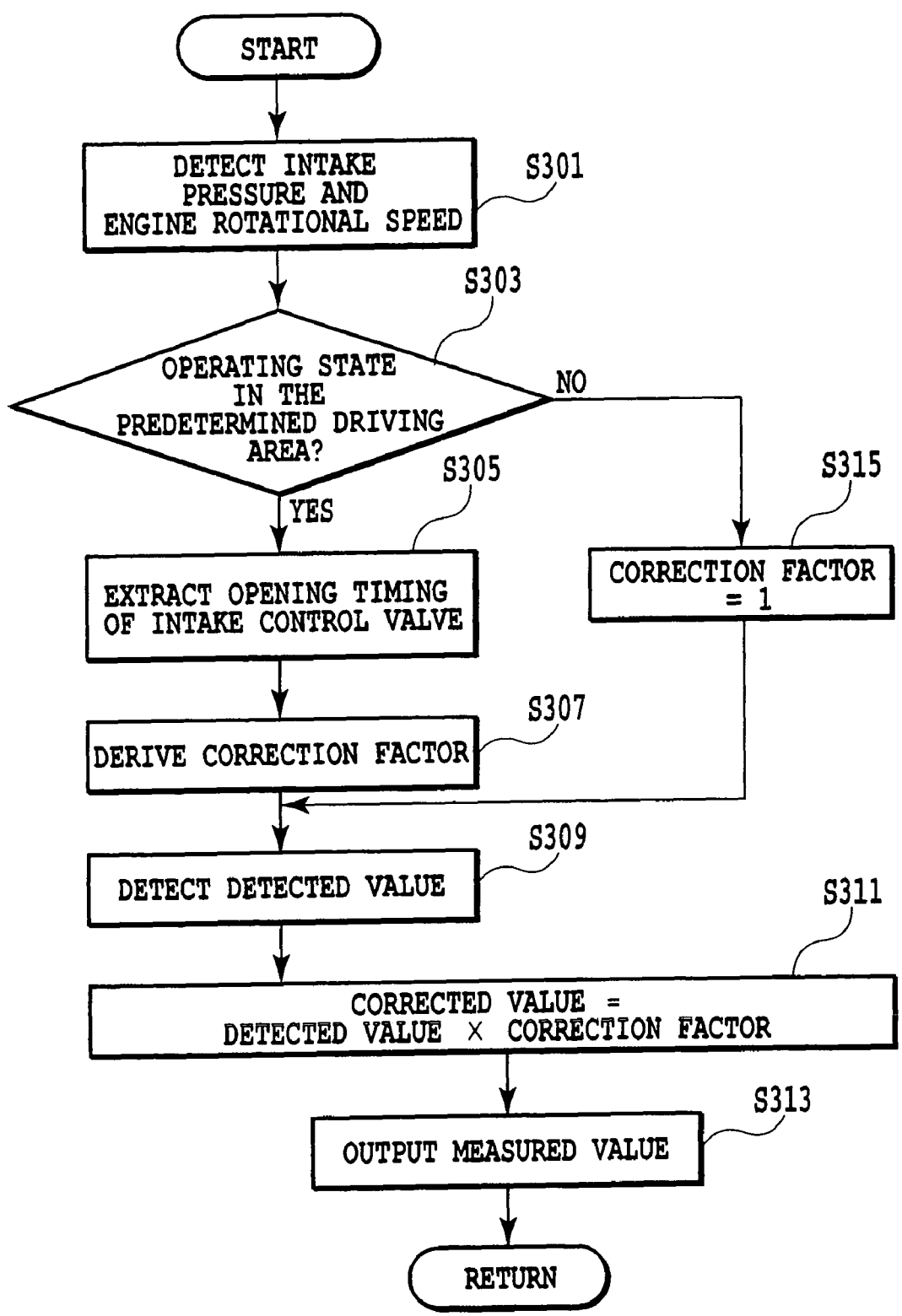
FIG. 3 is a flow chart for obtaining an amount of intake air in the device for controlling the internal combustion engine according to the first embodiment.

First, at step S301 in FIG. 3, the intake pressure as an engine load and the engine rotational speed are detected. Then, at step S303, it is determined whether or not the operating state of the engine 10 based on them is that in a predetermined driving area by the retrieval of data not shown. The term "predetermined driving area" used herein refers to a preset impulse supercharging area wherein the intake control valve 42 is made open or close in accordance with the opening/closing timing of the intake valve 24; for example, that under a low load or a low rotational speed, or that under a high load and a low rotational speed.

If the answer is YES at step S303; i.e. it is determined that the operating state is in the predetermined driving area wherein the intake control valve 42 is in the operative state, the routine proceeds to step S305 and the opening timing of the intake control valve 42 is extracted among the operation characteristics of the intake control valve 42. This opening timing of the intake control valve 42 is the opening timing of the intake control valve 42 relative to the opening timing of the intake valve 24 when the intake control valve 42 operates to open and close in accordance with another flow chart (not shown), which timing is read and extracted from RAM. Thereafter, the routine proceeds to step S307 at which a correction factor for the detected value as a value corresponding to the amount of intake air detected by the air-flow meter 48 is derived by retrieving mapped data not shown preliminarily stored in ROM, based on the opening timing of the intake control valve 42 and the engine rotational speed detected at step S301. That is, according to the present invention, when the intake control valve 42 is in the operative state, the value corresponding to the amount of intake air detected by the detector in correspondence to the operation characteristics of the intake control valve 42 is corrected. In the first embodiment, the opening timing of the intake control valve 42 relative to the opening timing of the intake valve 24 is extracted among the operation characteristics of the intake control valve 42. In this regard, since the larger the pressure difference in the air-intake path 30 between the upstream and the downstream from the intake control valve 42, the larger the change in the intake pulsation generated in the air-intake path 30, the correction factor is set so that the corrected amount is larger as the opening timing of the intake control valve 42 is later.

At step S309, the amount of air flowing through the air-intake path 30 is obtained as a detected value. The detected value referred to herein is a value corresponding to the amount of intake air fed to the engine 10 detected by the air-flow meter 48. When the routine proceeds to step S311, the detected value is corrected by multiplying the same with the correction factor obtained at the above-mentioned step S307 to be the corrected value. In this step, the detected value as the value corresponding to the amount of intake air detected by the air-flow meter 48 is corrected to be increased, for example, to reflect the actual amount of intake air. That is, the value corresponding to the amount of intake air is corrected so that the measured amount of intake air increases. Then, at step S313, the corrected value is output as the measured value indicating the actual amount of intake air.

On the other hand, if it is determined that the operating state is not in the predetermined driving area at step S303; i.e., the intake control valve 42 is in the non-operative state wherein no impulse supercharging is carried out, the routine proceeds to step S315 at which the correction factor becomes "1". As a result, as mentioned above, at step S311 the detected value detected at step S309 is regarded as the corrected value as it is, and output as the measured value of the amount of intake air at step S313. That is, the detected value is not substantially corrected but becomes the corrected value or the measured value as it is. In this regard, while the correction factor at step S315 is "1" in this example, since the pulsation of intake air may occur in the air-intake path 30 due to the opening/closing of the intake valve 24 even if the intake control valve 42 is in pause state; i.e., it is in the non-operative state, the correction factor obtained at step S315 may be changed in correspondence to the engine rotational speed or the engine load.

In this regard, according to the first embodiment, the detected value is not the output signal (output voltage) from the air-flow meter 48 but is the flow rate of air obtained from the predetermined relationship between the output signal and the flow rate of air. As a result, the corrected value and the measured value are equal to each other. If the detected value is the output signal itself from the air-flow meter 48, the corrected value is also the value relative to the output signal whereby the corrected value is different from the measured value. That is, the above-mentioned correction may not be done at the timing shown in the first embodiment but may be done at any timing in a period from the issuance of the output signal from detector to the controller 44 to the determination of the amount of intake air by the controller 44.

In such a manner, according to the first embodiment, the detected value by the air-low meter 48, as the value corresponding to the amount of intake air detected by the detector, in correspondence to the opening timing of the intake control valve 42 is corrected. For example, it is corrected to be increased in accordance with the opening/closing state of the intake control valve 42. Accordingly, the influence to the value corresponding to the amount of intake air, such as the pulsation of intake air due to the opening/closing operation of the intake control valve 42 is mitigated. Concretely, even if the air-flow meter 48 is used as the detector, there is none that the measured amount of intake air is largely less than the actual amount of intake air. Thereby, even if the amount of injected fuel is determined in accordance with another flow chart (not shown) by the retrieval from mapped data stored in ROM based on the measured amount of intake air, the amount of injected fuel is prevented from being largely differed from that corresponding to the actual amount of intake air. Accordingly, it is possible, for example, to make the air/fuel ratio to coincide with the theoretical air/fuel ratio as a desired air/fuel ratio. Also, it may be possible to correctively reduce the detected value by the air-flow meter 48, as a value corresponding to the amount of intake air detected by the detector in correspondence with the opening timing of the intake control valve 42; i.e., based on the operation characteristic of the intake control valve 42.

According to the first embodiment, the correction factor is obtained based on the opening timing of the intake control valve 42 and the engine rotational speed. The correction factor, however, may be determined solely based on the opening timing of the intake control valve 42. Alternatively, the correction factor may be determined based on any of the closing timing, the opening period or the closing period of the intake control valve 42 or any combinations thereof, or the engine rotational speed, the engine load or the pressure within the air-intake pipe (intake pressure). When the correction factor is determined, not only the opening timing of the intake control valve 42 relative to the opening timing of the intake valve 24, but also the closing timing, the opening period or the closing period of the intake control valve 42 may be used among the operation characteristics of the intake control valve 42. Also, the opening timing or others of the intake control valve 42 is not limited to be related to the opening timing of the intake valve 24 but may be related to any of the closing timing, the opening period or the closing period or any combinations thereof. For example, if the opening period of the intake control valve 42 is extracted at step S305, it is possible to determine the correction factor so that the corrected amount becomes larger as the opening period is longer.

By the way, in the above-mentioned first embodiment, the air flow rate is detected by the air-flow meter 48 and corrects the detected value if necessary to mitigate the influence such as pulsation of intake air caused by the opening/closing operation of the intake control valve 42 to result in the amount of intake air. The present invention, however, should not be limited thereto, but the amount of intake air may be measured by detecting, for example, the pressure in the air-intake path 30; i.e., the intake pressure by the intake air pressure sensor 50 as a value corresponding to the amount of intake air. Such a case will be described below as a second embodiment. In this regard, as the value corresponding to the amount of intake air, other than the above-mentioned air flow rate or intake air pressure may be used in the present invention, and any means may be used provided it could detect a value relative to the amount of intake air, as a value corresponding to the amount of intake air.

The amount of intake air generally corresponds to the intake pressure, and it is possible to indirectly obtain the amount of intake air from the intake pressure. Accordingly, in the second embodiment, the intake air pressure sensor 50 for detecting the interior pressure of the air-intake pipe 32 is used as the detector. Note, similarly to the first embodiment, according to the second embodiment, the controller 44 is constructed such that it includes a function of the correction means.

Figure 4:
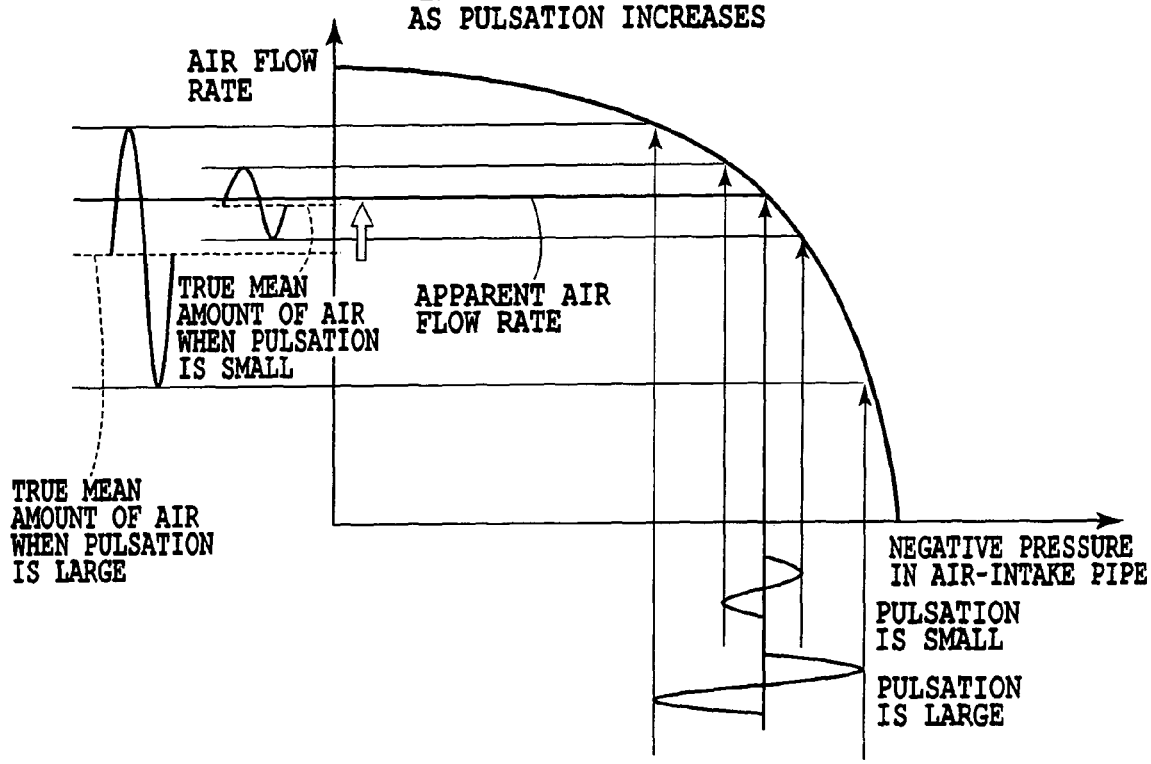
FIG. 4 is a graph representing the relationship between an amount of intake air and a negative pressure in an air intake pipe.

When the intake air pressure in the air-intake path 30 is detected by using the intake air pressure sensor 50, in the same manner as the air flow rate detected by using the air-flow meter 48, the intake air pressure may be influenced by the pulsation of intake air or others caused by the opening/closing operation of the intake control valve 42 as described above. Therefore, the value of the amount of intake air corresponding to the intake air pressure may have a large measurement error. For example, as schematically shown in FIG. 4 by way of example, as the change in the pulsation of intake air becomes larger, that is, as the pulsation increases, there is a tendency in that the negative pressure in the air-intake pipe detected by the intake air pressure sensor 50 (corresponding to the intake air pressure) becomes larger whereby the measured value of the amount of intake air increases relative to the actual amount of intake air.

Therefore, also in the second embodiment, the value detected by the intake air pressure sensor 50 is corrected. According to the second embodiment, the detector is different from that in the first embodiment, the process for correcting the value corresponding to the amount of intake air detected by the detector is the same s in the first embodiment. The process for the determination of the amount of intake air in the second embodiment will be described below with reference to the flow chart for the above-mentioned first embodiment shown in FIG. 3.

The intake air pressure and the engine rotational speed are detected (step S301) and it is determined whether or not the operating state is in the predetermined driving area. If it is determined that the operating state is in the predetermined driving area (step S303), the retrieval of the mapped data (not shown) is carried in correspondence with the opening timing of the intake control valve 42 (step S305) out to determine the correction factor (step S307). If the intake control valve 42 is in the operative state, the detected value; i.e., the intake air pressure (step S309) is corrected to be smaller, for example, so that the actual amount of intake air is reflected. That is, the value in correspondence to the amount of intake air is corrected to reduce the measured amount of intake air (step S311). Then, in accordance with this intake air pressure, the amount of intake air is determined by the retrieval of data not shown and output as the measured value of the amount of intake air (step S313). In such a manner, the effect similar to that of the first embodiment is obtained. In this regard, if it is determined that the operating state is not in the predetermined driving area (step S303), the detected value is not substantially corrected, and the amount of intake air corresponding to this detected value is output as the measured value (step S313).

Then, the description will be made on the device for controlling the internal combustion engine according to a third embodiment of the present invention. This engine system according to the third embodiment is provided in the air-intake pipe 32 with the air-flow meter 48 as detector, and has the same structure as in the first embodiment, whereby the explanation thereof will be eliminated for the purpose of avoiding the redundancy. The controller 44 in the third embodiment also is constructed such that it includes a function of the correction means in the same manner as in the first embodiment for processing the value corresponding to the amount of intake air detected by the air-flow meter 48. However, the difference from the first embodiment resides in that the correction for determining the measured value of the amount of intake air is carried out by applying a frequency filter to the value corresponding to the detected amount of intake air as described later. Accompanied therewith, the value corresponding to the detected amount of intake air becomes a voltage output from the air-flow meter 48, while the others are generally the same as in the first embodiment.

According to the third embodiment, the correction is made while paying attention to the voltage output from the air-flow meter 48 of a hot-wire type so that the amount of intake air is determined based on the corrected value. More concretely, as described later, the correction is made by removing frequencies in a specified range determined by the operation characteristic of the intake control valve from the voltage output from the air-flow meter 48. This process will be described below based on a flow chart shown in FIG. 5.

Figure 5:
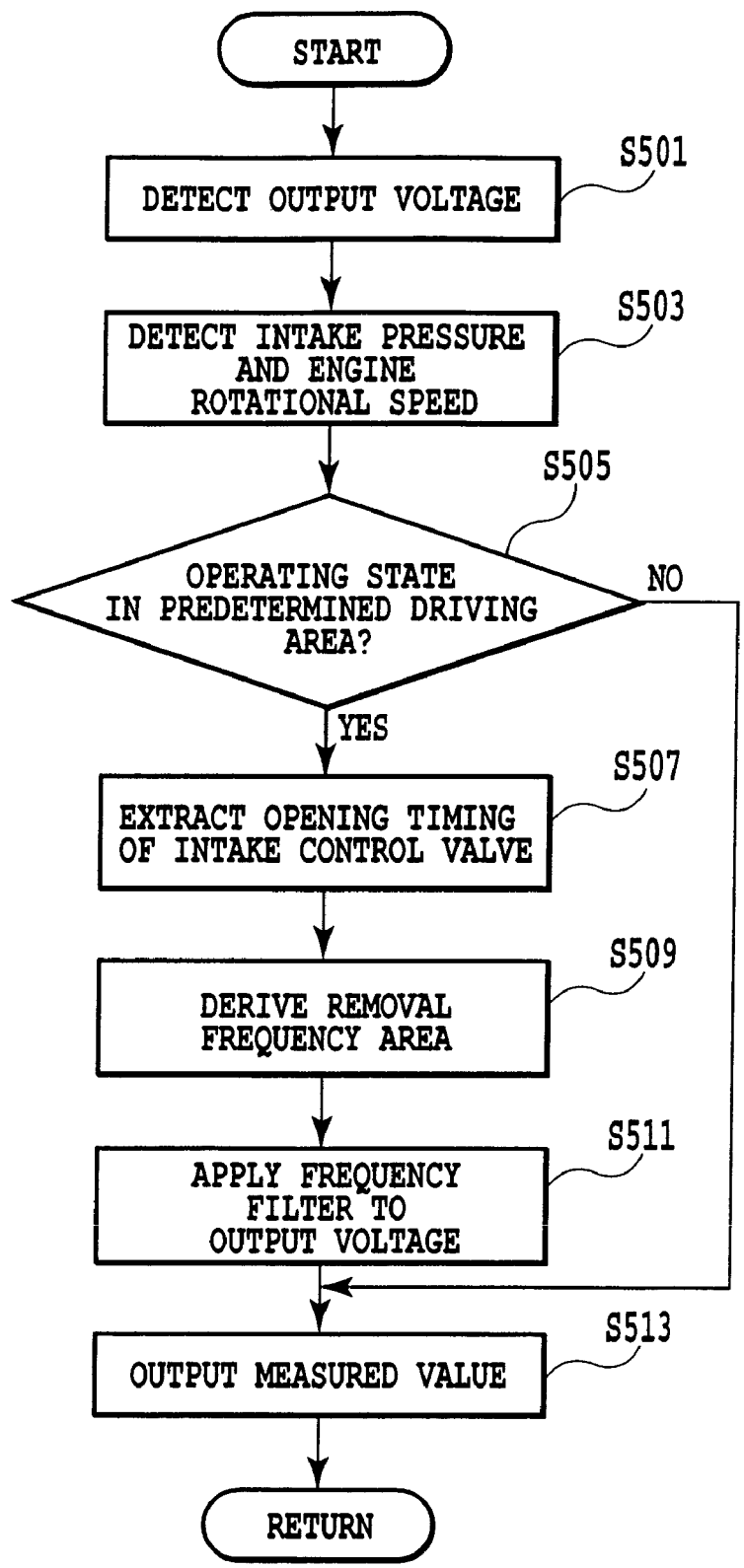
FIG. 5 is a flow chart for obtaining an amount of intake air in a device for controlling the internal engine according to a third embodiment.

First, at step S501 in FIG. 5, an output voltage which is an output signal from the air-flow meter 48 as a value based on a flow rate of air flowing through the air-intake path 30; i.e. its flow rate, is detected as a value corresponding to the amount of intake air fed to the engine 10. Then, at step S503, the pressure of intake air and the engine rotational speed are detected, and based thereon, it is determined at step S505 whether or not the operative state in the engine 10 is in a predetermined driving area by retrieving the mapped data (not shown). If it is determined that the operating state is in the predetermined driving area; i.e., the intake control valve 42 is in the operative state, the routine proceeds to step S507. At step S507, in the same manner as in step S305 (see FIG. 3) of the first embodiment, the opening timing of the intake control valve 42 stored in RAM is extracted among the operation characteristics of the intake control valve 42.

Figure 6:
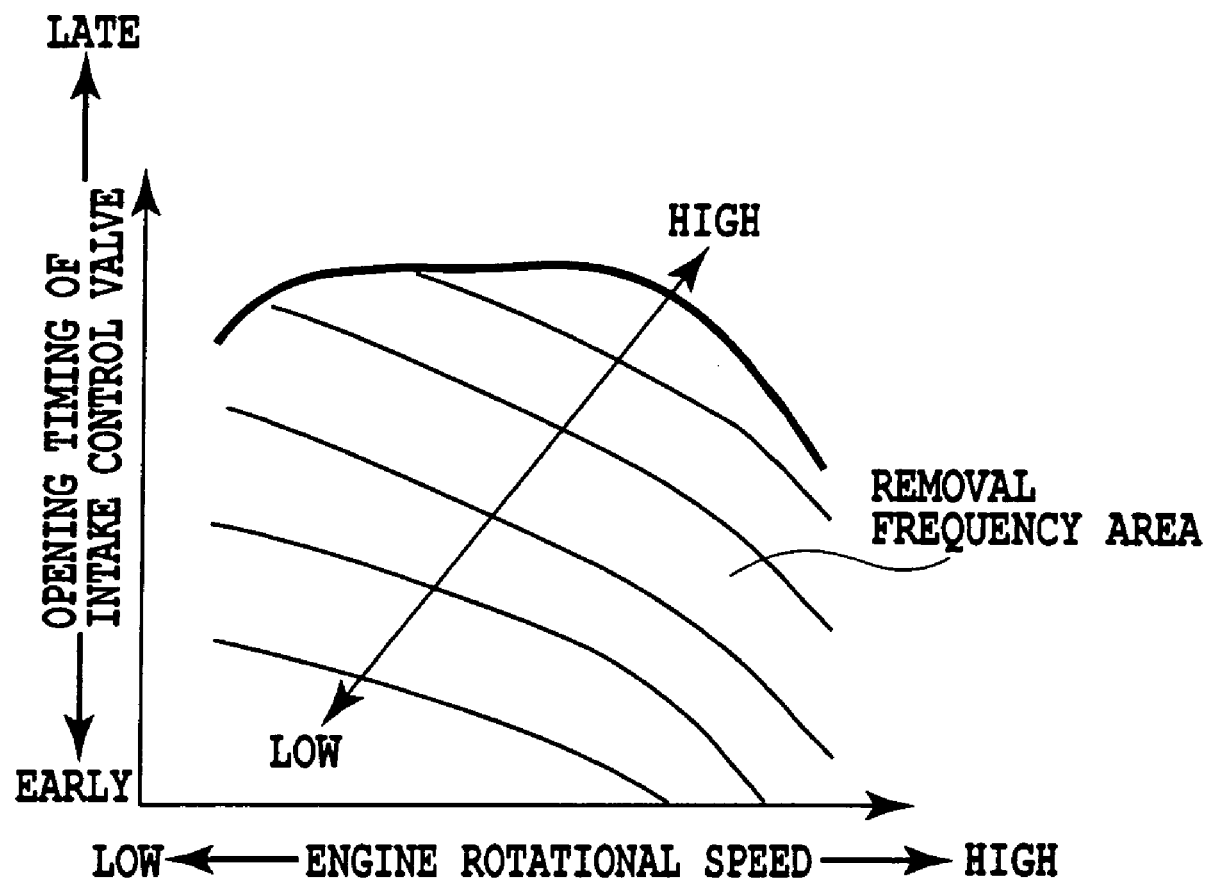
FIG. 6 is a graph representing areas of removed frequency in relation to the engine rotational speeds and the opening timing of the intake control valve.

Then, at step S509, the frequency area to be removed from the output voltage detected at step S501 (hereinafter referred to as a removal frequency area) is derived from mapped data shown in FIG. 6. The mapped data in FIG. 6 represents the removal frequency area relative to the engine rotational speed and the opening timing of the intake control valve 42. The data map is retrieved based on the engine rotational speed detected at step S503 and the opening timing of the intake control valve 42 detected at step S507 to determine the removal frequency area. For example, the later the opening timing of the intake control valve 42 relative to that of the intake valve 24, the higher the frequency in the removal frequency area. Also, the higher the engine rotational speed, the higher the frequency in the removal frequency area.

Figure 7:
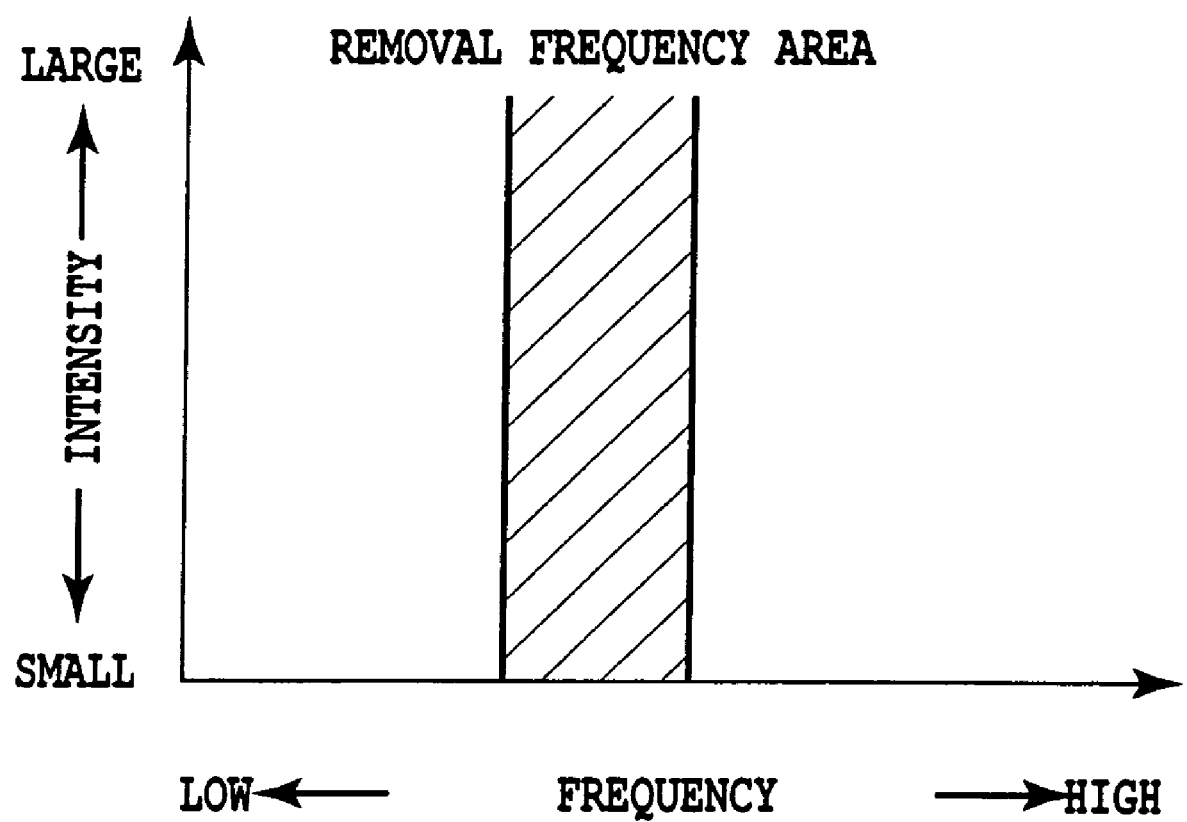
FIG. 7 is a graph wherein the areas of removed frequency is mapped.

At step S511, a frequency filter is applied to the output voltage detected at step S501 to remove the frequency within the removal frequency area. Concretely, as shown in FIG. 7, the removal frequency area is mapped on a graph while using a horizontal axis for representing the frequency and a vertical axis for the intensity. This graph is laid over another graph representing the frequency of the detected output voltage (not shown) in the same manner to remove the frequency in the removal frequency area from the detected output voltage. That is, the output voltage which is a value corresponding to the amount of intake air detected by the detector is corrected by using the removal frequency area. Thereafter, at step S513, the measured value corresponding to the corrected output voltage is derived by retrieving data representing the relationship between the output voltage and the amount of intake air, and is output as the measured value of the amount of intake air.

Contrarily, if it is determined at step S505 that the operating state is not in the predetermined driving area; i.e., the intake control valve 42 is in the non-operative state, the routine proceeds to step S513 at which the measure value of the amount of intake air is determined as described above and output without removing the frequency in the removal frequency area.

In this regard, another value based on the flow rate of air flowing through the air-intake path 30 detected at the above-mentioned step S501 may be a flow rate of air flowing through the air-intake path 30. Also, upon determining the removal frequency area, elements other than the engine rotational speed or the opening timing of the intake control valve 42 may be taken into consideration. For example, the removal frequency area may be determined based not only on the opening timing of the intake control valve 42, but also on either one of the closing timing, the opening period, the closing period of the intake control valve 42 or any combinations thereof as well as the engine rotational speed, the engine load and the pressure in the air-intake pipe.

According to the third embodiment, the air-flow meter 48 is used as detector, and the voltage output from the air-flow meter 48 is corrected. However, the present invention does not exclude the conversion of output voltage into the flow rate of air which is then corrected to be the measure amount of intake air.

By the way, it is necessary to measure or estimate the amount of intake air for the purpose of controlling the engine 10. To facilitate the measurement accuracy, when the amount of intake air instantaneously fluctuates due to the influence of noise or others, such an accident is considered as an error whereby not used in the actual control, or when the variation of instantaneous flow rate is large, it is determined that the air-flow meter 48 is abnormal. On the other hand, as described above, there may be a case wherein the pulsation of intake air or others increases, when the intake control valve 42 is in the operative state, that is, in the impulse supercharging state, resulting in the enlargement of variation width in the measured value of the amount of intake air. In such a case, if the error is determined in a general manner, that is, in the same manner as a case wherein the intake control valve 42 is in the non-operative state, there may be a risk in that many values corresponding to the amounts of intake air detected by the detector are determined as errors to disturb the proper operating of the engine 10. Accordingly, it is necessary to determine the amount of intake air to ensure the proper driving of engine 10 while mitigating the influence of the above-mentioned pulsation of intake air or others. Such a case will be described below as a fourth embodiment.

The engine system in the fourth embodiment is provided in the air-intake pipe 32 with the air-flow meter 48 as detector. Since such a construction is the same as in the first and third embodiments, the description thereof will be eliminated to avoid the redundancy. In this regard, the controller 44 in the fourth embodiment is constructed such that it includes a function of, in addition to the correction means, error determination means consisting of first and second error determination means for processing the value corresponding to the amount of intake air detected by the air-flow meter 48. As described later, the error determination means determines that there is an error when the value corresponding to the amount of intake air deviates from a predetermined value over a predetermined range.

Figure 8:
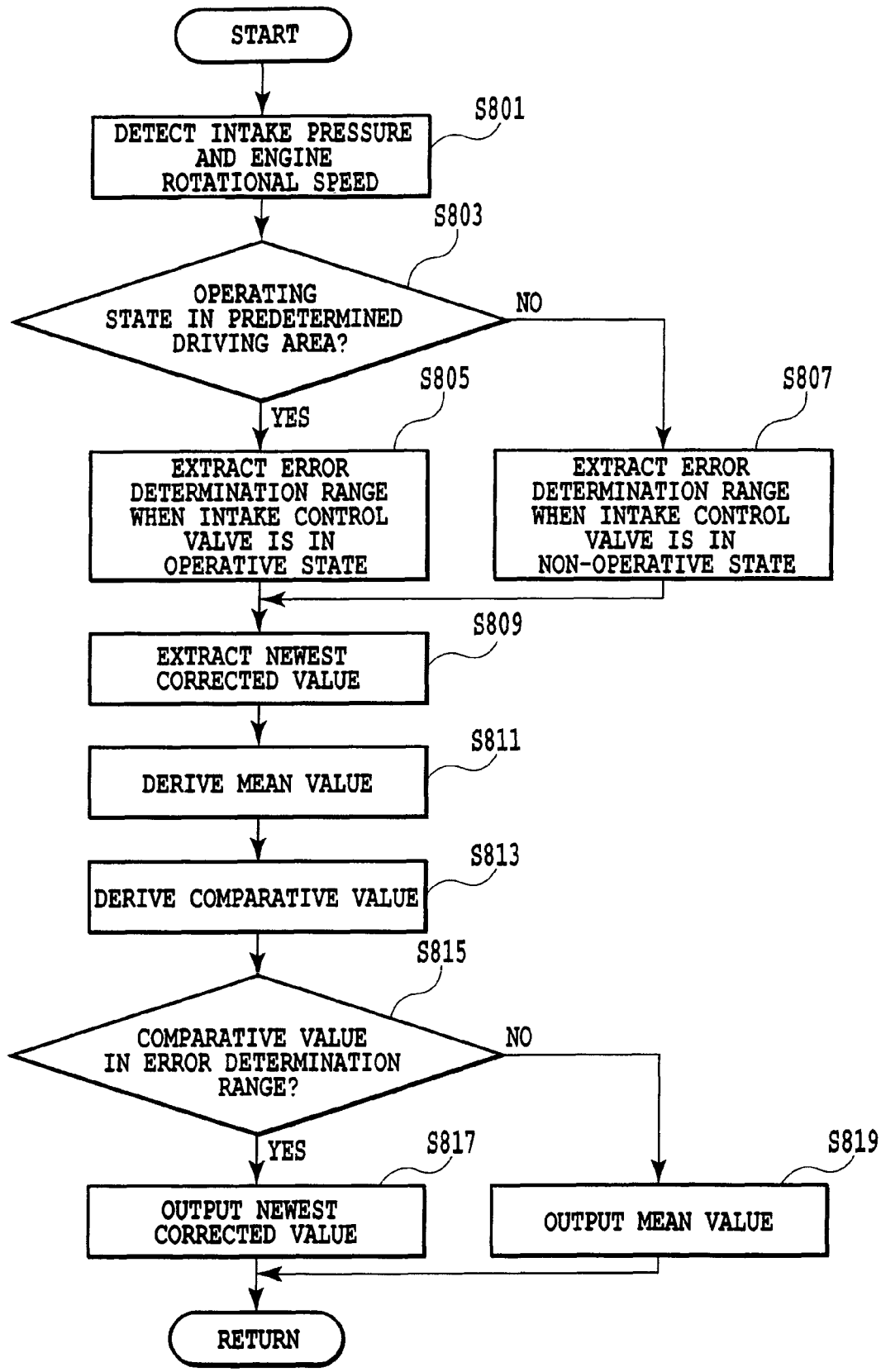
FIG. 8 is a flow chart for obtaining an amount of intake air in the device for controlling the internal combustion engine according to a fourth embodiment.

The fourth embodiment will be described below with reference to FIG. 8 wherein it is premised that the corrected value has already been obtained as described with reference to the first embodiment and stored in RAM, and a process for determining the measured value as the amount of intake air is solely represented in FIG. 8. In this regard, since the derivation of the corrected value has already described in the first embodiment, the description thereof will be eliminated to avoid the redundancy.

First, at step S801, the pressure of intake air and the engine rotational speed are detected, and at step S803, mapped data (not shown) are retrieved based on them to determine whether or not the operating state is in the predetermined driving area.

If it is determined that the operating state is in the predetermined driving area, the routine proceeds to step S805 at which the predetermined error determination range, for example, "±10%" preset in correspondence to the operative state of the intake control valve 42; i.e., the impulse supercharging state wherein the intake control valve 42 is operative to open/close is extracted from ROM. Contrarily, if it is determined that the operating state is not in the predetermined driving area, the routine proceeds to step S807 at which the predetermined error determination range, for example, "±12%" preset in correspondence to the non-operative state of the intake control valve 42; i.e., the non-impulse supercharging state wherein the intake control valve 42 remains open is extracted from ROM. That is, the error determination range when the intake control valve 42 is in the operative state is set wider than when it is in the non-operative state. Since the error determination range is wider when the intake control valve 42 is in the operative state in such a manner, even if the value corresponding to the amount of intake air is influenced by the pulsation of intake air or others, this value is not determined as error provided it is within this range, but adopted as the actual amount of intake air whereby the engine is properly controllable. In this specification, the error determination range as a predetermined area in correspondence to the operative state of the intake control valve 42 is referred to as a first error determination range, and the error determination range as a predetermined area in correspondence to the non-operative state of the intake control valve 42 is referred to as a second error determination range.

Subsequent to step S805 or S807, the newest corrected value is derived from RAM as the value corresponding to the amount of intake air detected by the air-flow meter 48 at step S809. In such a manner, a corrected value obtained based on a separate flow chart (not shown) and stored in RAM is used. However, by incorporating a plurality of the above-mentioned steps for obtaining the corrected value in FIG. 3 into step S809, the corrected value may be determined by the respective routine. At step S811, a mean value of preceding four corrected values obtained from RAM is determined, and a comparative value of the newest corrected value relative to the mean value is obtained by the following formula (1). In this connection, the comparative value is a ratio of the deviation of the value corresponding to the amount of intake air from the predetermined value. In the fourth embodiment, the value corresponding to the amount of intake air is the above-mentioned newest corrected value and the predetermined value is the above-mentioned mean value.

$$\text{Comparative value (\%)} = 100 - (\text{newest corrected value} / \text{mean value of preceding past four corrected values}) \times 100 \quad (1)$$

Herein, the mean value of the preceding past four corrected values is a mean value of the four most recent corrected values obtained preceding to the newest corrected value obtained this time. The present invention, however, should not be limited to four but may be one or more. The past four corrected values and the mean value thereof are stored in RAM and suitably renewed. However, at the starting of engine, the past four corrected values are not stored in RAM. Accordingly, until the four corrected values are obtained, all the corrected values are adopted whether or not they are within the error determination range.

If the comparative value is obtained, it is determined at step S815 whether or not the comparative value is within the error determination range determined at step S805 or 807. If it is determined that the comparative value is within the error determination range, the routine proceeds to step S817 from which this newest corrected value is output as the measured value of the amount of intake air. In this regard, the value output therefrom may be that taking the newest corrected value into consideration; for example, a mean value or others reflecting the newest corrected value may be output as the measured value of the amount of intake air. As described hereinabove, the value taking the newest corrected value into consideration is output as well as the mean value is renewed by using this newest corrected value for the purpose of a next routine.

On the other hand, if it is determined that the comparative value is not within the error determination range, the routine proceeds to step S819, at which the mean value obtained at step S811 is output as the measure value of the amount of intake air without taking the newest corrected value into consideration. The value output at this step may be that obtained by taking the corrected value determined prior to the newest corrected value into consideration, including, for example, the preceding corrected value which comparative value is within the error determination range or a value forecast based on the corrected value obtained prior to the newest corrected value. In this regard, while the value obtained by taking the corrected value obtained prior to the newest corrected value into consideration is output in such a manner, the past mean value is not yet renewed at this stage. This is because the above-mentioned mean value is derived by the corrected value within the error determination range.

According to the fourth embodiment, when it is determined whether or not the value corresponding to the amount of intake air detected by the detector is error, it is determined whether or not the comparative value is within the error determination range so that the error determination range has a certain width based on the mean value. However, the present invention also includes a case wherein the error determination range is defined as a threshold represented by an absolute value. If the error determination range is defined as a threshold represented by an absolute value as described above, the value corresponding to the amount of intake air detected by the detector may be directly compared with the threshold which is the error determination range to determine whether or not the value is error. In this regard, the first error determination range may be obtained each time in correspondence to either one of the opening timing, the closing timing, the opening period or the closing period of the intake control valve 42 or any combinations thereof, and the engine rotational speed, the engine load or the pressure in the air-intake pipe.

The inventive device for controlling an internal combustion engine has been described above in accordance with the first to fourth embodiments. The present invention, however, should not be limited thereto. For example, instead of a gasoline engine of a direct injection type described in the above embodiments, it is also effective for a diesel engine using no ignition plug and, of course, has the same effect as in the gasoline engine.

The invention claimed is:

1. A device for controlling an internal combustion engine, comprising an intake control valve provided in an air-intake path at a position upstream from an intake valve, said intake control valve being controlled to be either in an operative state operating in relation to an operation said intake valve or in an non-operative state maintaining said air-intake path always open, and, in the operative state, closed at least prior to the opening of said intake valve and opened after the opening of said intake valve to generate a pressure difference between the upstream and downstream from said intake control valve; said device comprising a detector for detecting a value corresponding to an amount of intake air fed to said internal combustion engine, and correction means for correcting said value corresponding to the amount of intake air detected by said detector, in correspondence to the operation characteristics of said intake control valve when said intake control valve is in said operative state, wherein said correction means uses an opening timing of said intake control valve in correspondence to the opening timing of said intake valve among the operation characteristics of said intake control valve.

2. A device for controlling an internal combustion engine as defined by claim 1, wherein said correction means makes the correction amount larger as the opening timing of said intake control valve is later in relation to the opening timing of said intake valve.

3. A device for controlling an internal combustion engine, comprising an intake control valve provided in an air-intake path at a position upstream from an intake valve, said intake control valve being controlled to be either in an operative state operating in relation to an operation said intake valve or in an non-operative state maintaining said air-intake path always open, and, in the operative state, closed at least prior to the opening of said intake valve and opened after the opening of said intake valve to generate a pressure difference between the upstream and downstream from said intake control valve; said device comprising a detector for detecting a value corresponding to an amount of intake air fed to said internal combustion engine, and correction means for correcting said value corresponding to the amount of intake air detected by said detector, in correspondence to the operation characteristics of said intake control valve when said intake control valve is in said operative state, wherein when said detector is an air-flow meter of a hot-wire type, said correction means corrects the value corresponding to the amount of intake air detected by said air-flow meter to be larger so that the actual mount of intake air is reflected.

4. A device for controlling an internal combustion engine, comprising an intake control valve provided in an air-intake path at a position upstream from an intake valve, said intake control valve being controlled to be either in an operative state operating in relation to an operation said intake valve or in an non-operative state maintaining said air-intake path always open, and, in the operative state, closed at least prior to the opening of said intake valve and opened after the opening of said intake valve to generate a pressure difference between the upstream and downstream from said intake control valve; said device comprising a detector for detecting a value corresponding to an amount of intake air fed to said internal combustion engine, and correction means for correcting said value corresponding to the amount of intake air detected by said detector, in correspondence to the operation characteristics of said intake control valve when said intake control valve is in said operative state, wherein when said detector is a sensor for detecting a pressure in an air-intake pipe, said correction means corrects the value corresponding to the amount of intake air detected by said sensor to be smaller so that the actual mount of intake air is reflected.

5. A device for controlling an internal combustion engine, comprising an intake control valve provided in an air-intake path at a position upstream from an intake valve, said intake control valve being controlled to be either in an operative state operating in relation to an operation said intake valve or in an non-operative state maintaining said air-intake path always open, and, in the operative state, closed at least prior to the opening of said intake valve and opened after the opening of said intake valve to generate a pressure difference between the upstream and downstream from said intake control valve; said device comprising a detector for detecting a value corresponding to an amount of intake air fed to said internal combustion engine, and correction means for correcting said value corresponding to the amount of intake air detected by said detector, in correspondence to the operation characteristics of said intake control valve when said intake control valve is in said operative state, further comprising error determination means for determining that the value corresponding to said amount of intake air is erroneous if the deviation of the value from a predetermined value is out of a predetermined range, wherein said error determination means has, as said predetermined range, a first error determination range used when said intake control valve is in said operative state, and a second error determination range used when said intake control valve is in said non-operative state; said first error determination range is set to be larger than said second error determination range.

\* \* \* \* \*

UNITED STATES PATENT AND TRADEMARK OFFICE
CERTIFICATE OF CORRECTION

PATENT NO.         : 7,765,051 B2                                    Page 1 of 1
APPLICATION NO.    : 11/597789
DATED              : July 27, 2010
INVENTOR(S)        : Masakazu Tabata et al.

It is certified that error appears in the above-identified patent and that said Letters Patent is hereby corrected as shown below:

| Column | Line | |
|---|---|---|
| 2  | 10 | After "operation" insert --of--. |
| 3  | 19 | Change "mount" to --amount--. |
| 6  | 54 | After "one end" insert --of--. |
| 8  | 60 | Change "air-low meter 48" to --air-flow meter 48--. |
| 10 | 22 | Change "same s" to --same as--. |
| 14 | 61 | After "operation" insert --of--. |
| 15 | 11 | Change "A device" to --The device--. |
| 15 | 20 | After "operation" insert --of--. |
| 15 | 36 | Change "mount" to --amount--. |
| 15 | 42 | After "operation" insert --of--. |
| 16 | 20 | After "operation" insert --of--. |

Signed and Sealed this
Fifteenth Day of February, 2011

David J. Kappos
*Director of the United States Patent and Trademark Office*